Aug. 27, 1968 R. T. RAIVIO 3,398,633

APPARATUS FOR EFFECTING DESIRED REGISTRATION BETWEEN A PATTERN AND A PRINTING SURFACE

Filed April 11, 1967 3 Sheets-Sheet 1

INVENTOR.
ROLF T. RAIVIO

BY Robert H. Jacob

AGT.

INVENTOR.
ROLF T. RAIVIO
BY
Robert H. Jacob
AGT.

INVENTOR
ROLF T. RAIVIO

BY Robert H. Jacob
AGT.

United States Patent Office 3,398,633

Patented Aug. 27, 1968

3,398,633

APPARATUS FOR EFFECTING DESIRED REGISTRATION BETWEEN A PATTERN AND A PRINTING SURFACE

Rolf T. Raivio, Kulosaaren Puistotie 42 as. 39, Helsinki, Finland

Continuation-in-part of application Ser. No. 258,318, Feb. 13, 1963. This application Apr. 11, 1967, Ser. No. 630,137

Claims priority, application Finland, Feb. 16, 1962, 323/62

5 Claims. (Cl. 88—14)

ABSTRACT OF THE DISCLOSURE

A machine for registering a printing surface with a model surface comprises relatively movable supports for the two surfaces and an enlarging optical system for viewing superimposed images of corresponding regions of the two surfaces. The two supports and the optical system are relatively movable in the printing direction so that the two surfaces may be conjointly explored. An adjusting mechanism is provided so as to move one or the other of the supports or the optical system in such a manner as to effect a predetermined gliding movement of the superimposed images with respect to each other in the printing direction so as to achieve a desired type of registration or misregistration between the two surfaces.

The present application is a continuation in-part of my copending application Ser. No. 258,318, filed Feb. 13, 1963, for "Apparatus for Effecting Desired Registration Between a Pattern and a Printing Surface."

This invention relates to the precision mounting of printing surfaces or components thereof. In known equipment for this purpose it is possible to compare optically with each other the basic picture and the printing surface to be mounted in original size from such a distance that it is not possible to discern sufficiently small dects, and furthermore so that the factors effecting the registering, such as the printing machine, the paper or other material or surface to be printed and the printing proper, are not taken into consideration.

In other known equipments a basic picture made on transparent foil by some means fixed on the printing surface to be mounted is used for achieving a rough registering capacity. Even in this case it is not possible to reach sufficient accuracy, for instance because of the reasons mentioned above, and also because the details of the surface to be mounted are not always clearly discernible through the basic picture, and because the foil, being on the working object, hinders the working.

In known equipment there are further employed coordinate rulers sliding above the mounting foundation. With this kind of equipment the different printing surfaces for one and the same picture spread have to be made after measures previously taken down.

In many printing offices the mounting work of the printing surfaces is partly carried out in a proof printing machine or in a discarded old printing machine.

However, when using any of the above mentioned equipment, the register work, due to required accuracy, must be carried out entirely in printing machines, also so-called proof printing machines included, by moving various details according to defects found in pictures printed in these machines, until after numerous tries the defects have been eliminated.

There is no auxiliary equipment for the letter press for direct carrying out of the mounting work with definite accuracy. This concerns both flat bed and cylinder printing machines.

The invention concerns a register microscope with which these disadvantages have been eliminated, and by means of which the mounting of the printing surface or part of it can be carried out with definite accuracy according to the pattern.

According to the present invention there is provided a machine for registering a printing surface with a model surface comprising first and second supports for the two surfaces respectively and an enlarging optical system arranged for viewing superimposed images of corresponding regions of the two surfaces, the said supports and the optical system being so movable relative to one another in the printing direction that the two surfaces may be conjointly explored in the printing direction, and an adjusting mechanism being coupled to a part of the machine which moves as such exploration takes place and to one or other of the said supports or part of the optical system so as to move the support or optical system part in such a manner as to effect a gliding movement of one of the superimposed images with respect to the other in the printing direction, the said mechanism being itself adjustable for varying the amount of gliding movement provided thereby.

The machine may be entirely separate from the printing machine or may be incorporated therein as a fixed or removable attachment. The printing direction is the direction of paper movement in a printing machine printing off the said printing surface.

Embodiments of the invention will now be described by way of example with reference to the accompanying drawings, in which.

Figures 4, 5, 6, 7, 8A, 8B, 8C, 9A, 9B, 10:
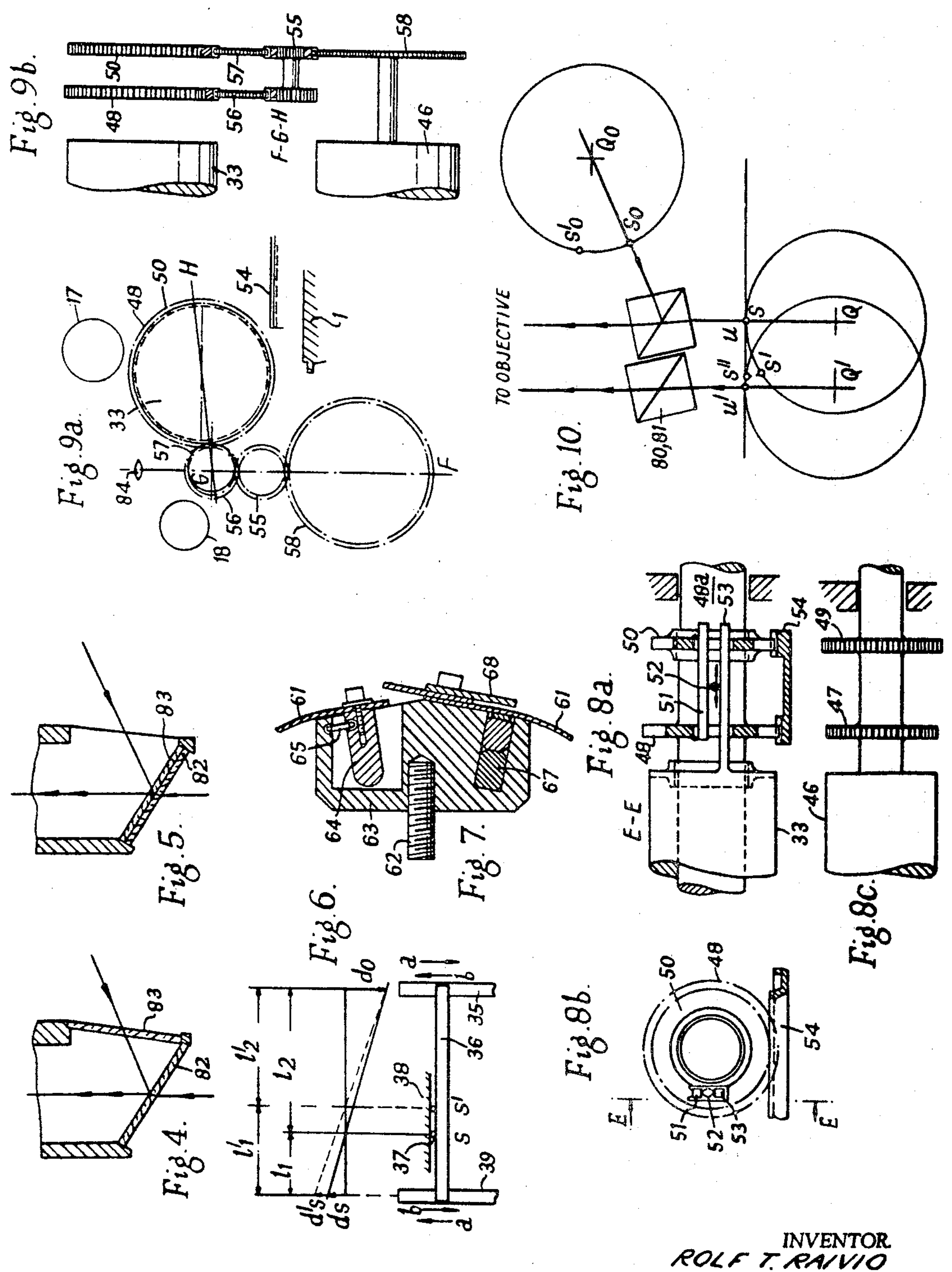
FIG. 4 shows one alternative for the replacement of the prisms combining the images.
FIG. 5 shows another alternative for the replacement of the prisms combining the images.

FIG. 6 gives some movements of a scale adjustment;

FIG. 7 shows the fixing parts of the cover sheet on the cylinder surface;

FIGS. 8*a*, 8*b*, 8*c* show the details of another scale adjusting device;

FIGS. 9*a*, 9*b* show the principles of machines registering plane and cylinder printing surfaces with cylinder model carriers, and FIG. 10 represents gliding of images with each other, which results in scale adjustment.

Figure 1:
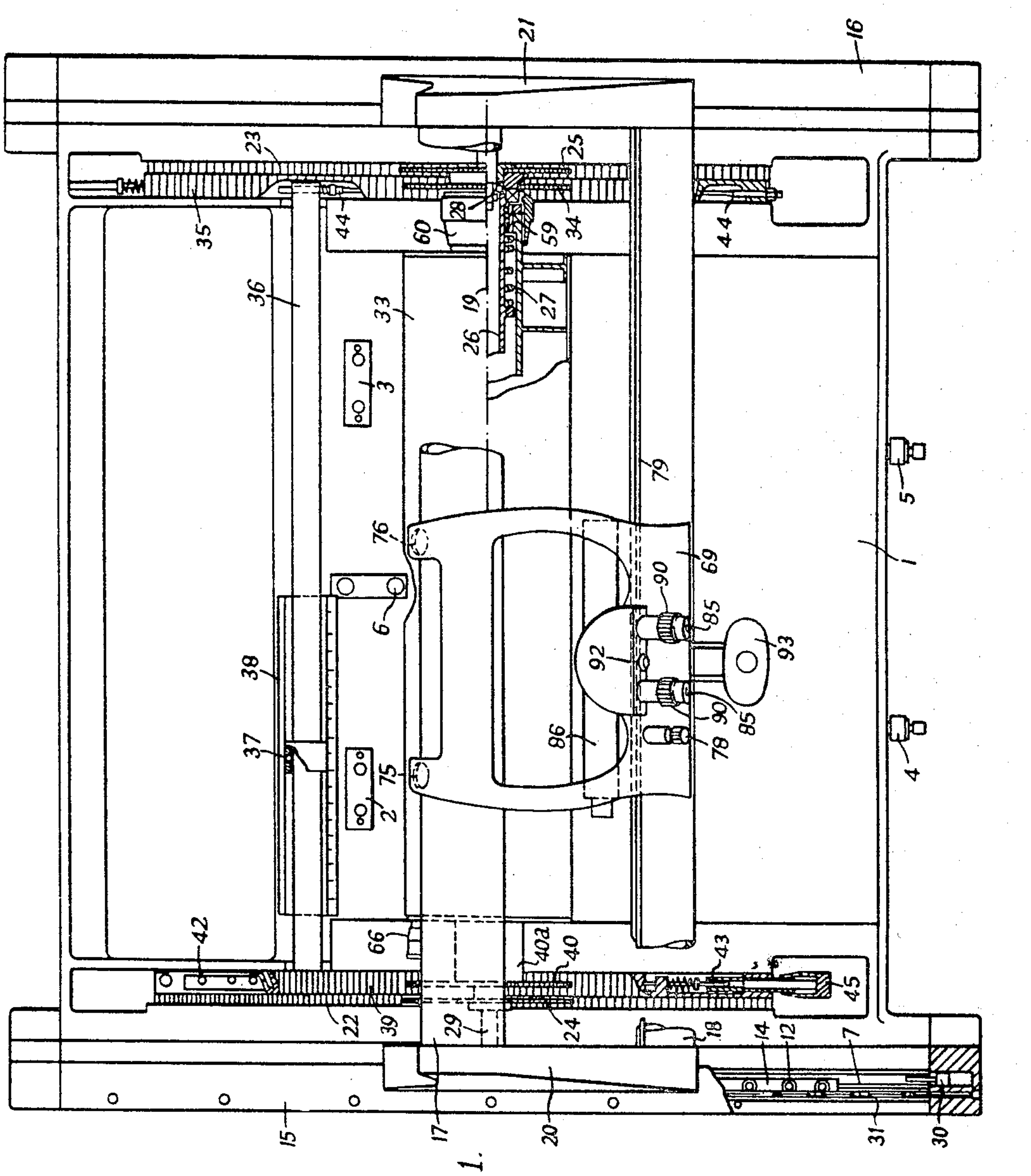
FIG. 1 is a plan view of one machine embodying the invention. Some portions have been partly cut away in order to show parts located below and inside.
Figure 2:
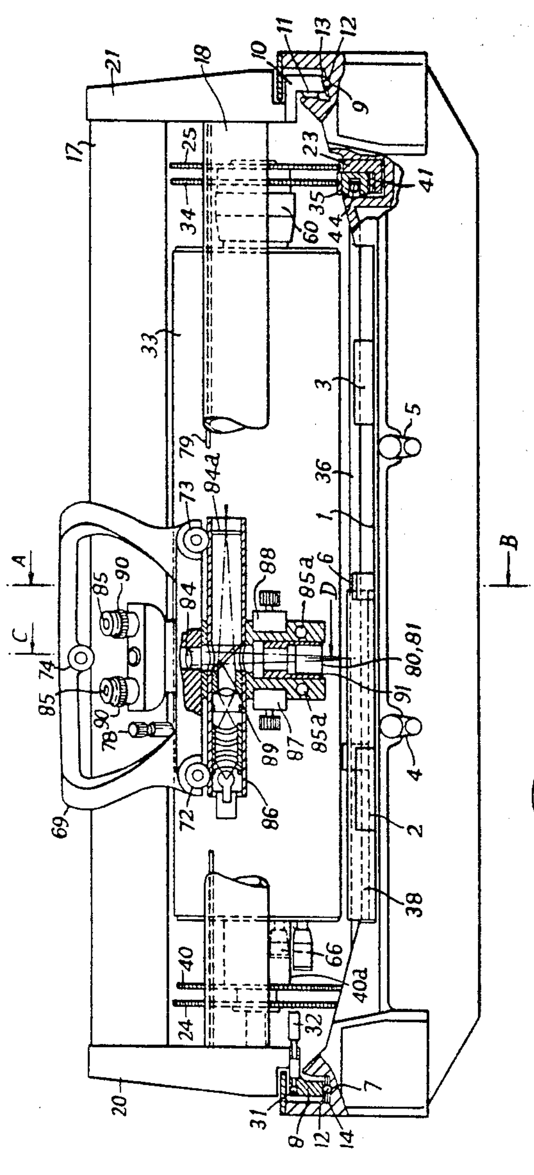
FIG. 2 is a front view of the machine, the optical system having been partly sectioned.
Figure 3:
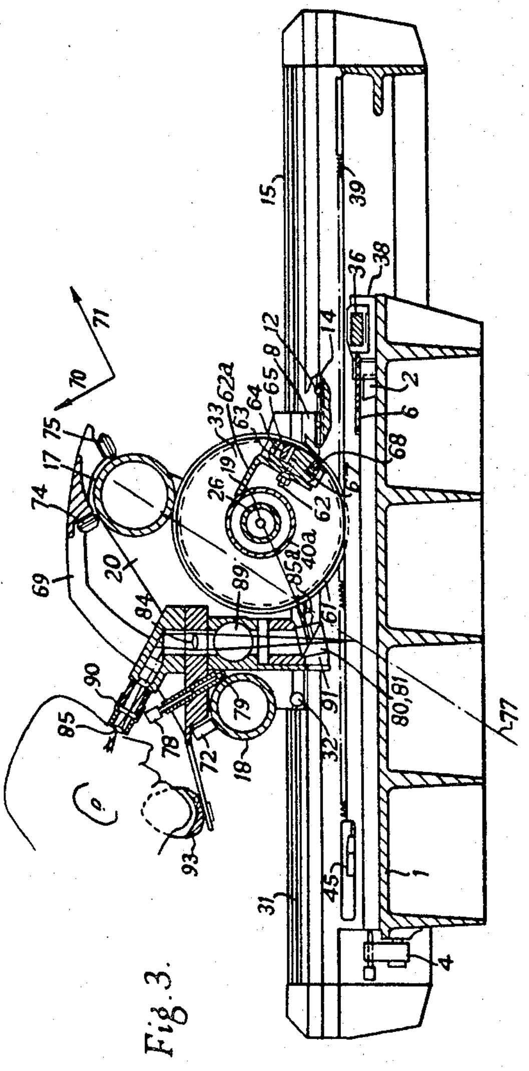
FIG. 3 is an end view of the machine seen from right to left and sectioned in such a way that the frame parts and the cylinder have been cut on the line A to B and the slide parts on the line C to D of FIG. 2.

Referring to FIGS. 1 to 3, a registering machine has a flat bed 1, which is the size of the required printing surface and has fixing devices 2–5 for fixing a plate on the bed. The fixing devices 2–5 for the printing plate may be similar to those in corresponding printing machines. If required they can be a combination of fixing devices of different printing machines.

An accurately divided and calibrated scale 6 is fitted to the machine frame on top of the bed 1. A point taken on the scale represents the edge of the working area and the pattern. The scale may be laterally rotatable. Scale 6 can be used as a help in fastening any printing surface or its fixing means (for instance a frame) in the correct position.

A carriage is movable backwards and forwards (i.e. in the printing or longitudinal direction) over the bed 1 and comprises end pieces 20 and 21 spanned by guide bars 17 and 18 on which a microscope 85 is transversely slidable.

The carriage also supports a cylinder 33 which serves as a pattern carrier means for the model with which the plate is to be registered, and as the carriage moves the cylinder rotates. An optical system or means, to be described, combines images in the microscope of corresponding parts of the model and plate.

The carriage slides on V-groove ball tracks 7 and 9. One of the guide carriage ball tracks 7 supports one end of the carriage keeping it in horizontal position without lateral constraint since the slide 8 of the end piece 20 supported by it is flat bottomed. The other track 9 provides lateral guiding since the bottom of the slide 10 of the end piece 21 is inclined to throw the carriage to the left, whereby the slide 10 also bears against a guiding surface 11 parallel with the race. The carriage is thus maintained horizontal at each of its ends and is laterally guided at one end. The carriage moves supported by balls 12, which are spaced by cages 13, 14. Experience shows that there should be sufficient oil in the races for it continuously to wash the race surfaces and the balls for preventing the accumulation of dirt. In the races 7, 9 there has to be sufficient space for the dirt accumulating in the oil to thicken into a stationary layer. From above the races are protected against dust by covers 15, 16.

The longitudinally moving guide carriage carries a distance rod 19 upon which rotates the shaft 26 of the cylinder 33 under the action of gear wheels 24, 25 which run on rack bars 22 and 23 as the carriage moves. Means are provided for regulating the relative movement between printing surface on bed 1 and the pattern on cylinder 33. Such means comprise, among other components, the gear wheels 24, 25 and the rack bars 22 and 23.

Gear wheel clearances are taken up under the action of a spring 27. The shaft 26 on the ends of which the gear wheels 24, 25 are fixed has bearings such that only the bearing 28 at the one end ensures axial location. The other bearing is able to slide on a shaft pin 29 fixed to the end piece 20. At the ends of the races 7, 9 there are four oil shock absorbers 30, which function with the race oil and receive the shocks when the carriage hits either end.

In the space containing one ball track 7 and parallel with it a steel wire 31 is fixed to the frame. This wire passes through the slide part 8 of the carriage, and by means of a screw 32 it may be secured to the slide part, whereby the carriage is locked. This locking is necessary for the making of transverse rulings in which the crossed hair lines of the optical system (which may have a scale or reading off deviations) are moved transversely on the carriage.

The cylinder 33 may be adjusted axially and rotationally with respect to the shaft 26 as will be described below. In addition the amount by which it rotates for a given longitudinal movement of the carriage can be varied to compensate for differences between the scales of the printing plate and the model.

In FIG. 10 consider the circle, center $Q_o$ to represent the cylinder 33, having two points $S_o$ and $S_o'$ on its periphery. Prisms 80, 81 (to be described) cause the cylinder to appear to be in the position of the circle center Q, with points S and S' corresponding to $S_o$ and $S_o'$. Initially S is supposed to be coincident of the optical axis of the optical system with the corresponding point U on the plate on the bed 1. Assuming a pure rolling motion of the cylinder 33 on the bed 1 to the point Q' the point S' arrives at S'' which is in general not coincident with the corresponding point U' because of a difference of scales. However S'' and U' may be made to coincide, by superimposing an additional rotation on the cylinder 33 about the point Q', which will be called a glide movement. In this way the scale difference can be compensated, assuming that the difference follows a constant law over the length of the plate. Of course compensation is only known to be exact along the transverse line observed when the amount of glide movement is adjusted but, when the image field is correctly chosen, the errors in other areas are so small that they are of no consequence.

Any error in the peripheral direction which follows a known law can be corrected with a glide following the same principle.

The glide in question may be induced in several different ways, merely by movement of the basic picture (as above), the printing surface or the optical system. Thus the question is only to induce a linearly variable glide, in regard to the desired coordinate movement, to the images discernible in the optical system.

The necessity for scale changing arises for instance for the following reasons: Different printing machines, papers or foils and so on, different works, overlays and pressures give different lengths between the same two points of an image. This scale error is not very great but it is greater than is acceptable in most multicolor work.

In the present embodiment of the invention the glide movement of the cylinder 33 is achieved by rotating the cylinder uniformly on the shaft 26 as the carriage moves. To this end a further gear 34 fixed to the shaft 26 has a different number of teeth from the gear 25 and therefore moves a cooperating rack bar 35 longitudinally as the shaft 26 rotates. The rack 35 is supported on a ball track 41 and the total movement of the rack for a movement of the carriage over its full travel is the distance $d_o$ shown in FIG. 6.

The movement of the rack 35 is transmitted to a further rack 39 supported on a ball track 42 by a first order lever 36 whose fulcrum 37 may be adjusted transversely in a calibrated slide 38 to vary the lever ratio. The rack 39 rotates a gear 40 which is fixed to a shaft **40*a* which rotates on the shaft 26 and has fixed to it the cylinder 33. The means for effecting supplemental movement, i.e., for varying the amount by which cylinder 33 rotates for a given longitudinal movement with respect to bed 1 in order to compensate for the aforementioned differences in scale, comprise, among other things, gear 34, rack 35, lever 36 and fulcrum 37, rack 39 and gear 40 on shaft 40*a* associated with shaft 26**.

The movement of the rack 39 is a proportion of the movement of the rack 35, determined by lever proportion $l_1/l_2$ indicated in FIG. 6. By moving the fulcrum 37 from position $s$ to position $s'$ the lever proportion is altered from $l_1/l_2$ to $l_1'/l_2'$ and the regulating movement from $d_o.l_1/l_2=d_s$ to $d_o.l_1'/l_2'=d_s'$. The calibrated slide therefore indicates the magnitude of $d_s$.

The same movement can be transmitted with similar effects, for instance by means of a single-arm lever construction, to the bed 1, this being supported by bearings on the machine frame. In this case the cylinder is stationary with respect to the shaft 26.

It is also possible with similar effects to obtain the glide movement by means of an eccentric on the shaft 26 and a lever operating thereagainst fitted to the end piece 21. This movement may be transmitted by a lever construction to the optical system or a part of it. This way, too, the images are induced to move with respect to each other.

In order to make it possible, when the cylinder 33 is in such a position that the edge of the bed 7 is seen in the optical system, to adjust the fulcrum 37 so that the lever 36 does not move (so that all different amounts of glide have the same zero position), one side of the lever 36 is straight, and the fulcrum 37 moves along a straight graduated slide 38 which is parallel to the lever when the cylinder is in zero position. As racks 35, 39 are connected to the lever 36 by long intermediate rods 43, 44 without clearance, and the length of one intermediate rod 44 is adjustable, it is possible to change that position of the cylinder at which the adjustment of the fulcrum 37 does not move the lever. That is the position where the lever and the slide are parallel. The head of rack 39 rests on a regulating screw 45, by means of which the basic portion of the cylinder on the shaft 26 may be adjusted.

It is also possible to construct a machine in which the guide carriage moves a straight ruler which runs in the direction from the front to the back of the machine and is at least as long as the maximum length of the printing surface and the inclination of which with respect to the longitudinal direction is adjustable. This ruler is arranged in accordance with its own adjustable inclination and the movement of the carriage to actuate a lever fitted to the frame, which in its turn moves either the bed 1 supported by bearings on the frame, or for instance the rack 39, which in its turn transmits the movement by means of the gear 40 to the cylinder 33. Alternatively the adjustable ruler can be fitted to the frame, in which case the lever resting against it is fastened to the guide carriage. The movement caused by the ruler in this lever can be transmitted either to change the position of the cylinder in regard to the optical system and the plane, or to move the optical system proper or part of it.

A machine in accordance with this invention can also be constructed for precision mounting work of cylindrical printing surfaces or their parts. This machine may be built for instance so that a model carrier cylinder 33 (FIGS. 8*a*, *b* and *c*) and a cylinder 46 parallel with it and carrying the printing surface rotate with respect to each other with the aid of gear wheels 47, 48, 49, 50, the diameters of which are greater than those of the cylinders. The gears 47 and 48 mesh and so do the gears 49 and 50. The optical system moves on guide bars which are parallel with the cylinders, and the rotation of the cylinders with respect to the optical system gives the coordinate movement in the printing direction. The scale adjustment required is achieved by an adjustable guide movement caused by the basic rotating movement of the cylinders 33, 46. The sum of the teeth of the gear wheels 49, 50 is the same as that of the gear wheels 47, 48, but the gear ratios are different. The gear wheels 49 and 47 are fixed together but the gear wheel 50 can rotate on the shaft **48*a* of the gear 48. The gear wheels 48, 50 are spaced apart and when they rotate with respect to each other, a connecting bar 51 running between the two wheels is skewed. The movement of the bar 51 is transmitted to the cylinder 33, which can rotate on the shaft 48*a*, by means of an adjustable fulcrum 52 and a pin 53 fixed to the cylinder. The cylinder movement in relation to the other cylinder is adjustable by moving the fulcrum 52 axially. The movement may also be alternatively transmitted to the other cylinder 46**.

A similar adjustment mechanism may be used in the case of the flat bed construction by replacing the gear wheels 47, 49 with a rack 54, which corresponds to the racks 22, 39 but is fixed to the machine frame. Otherwise the entire construction is the same as in the two-cylinder modification mentioned above. The glide movement is transmitted to the cylinder 33.

The plane and the cylinder modifications may further be combined into a single register microscope with the aid of which it is possible to mount a plane printing surface and a cylinder printing surface successively for such a two-color letter press which prints one color from the cylinder and the other from the plane, one after the other.

Such an arrangement is illustrated in FIGS. 9*a* and 9*b* having a printing cylinder 46 and a flat bed 1 with a fixed rack 54 which can mesh with the gears 48 and 50 which are arranged as in FIGS. 8*a*, *b* and *c* with the mechanism 51, 52, 53. For rotary work however the gears 48 and 50 mesh with idler gears 56 and 57 of equal diameter and these in turn mesh with two gears 55 fixed together and in mesh with the gear 48 fixed to the cylinder 58. The gear ratios 48–56–55 and 50–57–55 differ so as to obtain the rotation of gear 50 relative to the gear 48 as described in relation to FIGS. 8*a*, *b* and *c*.

The machine in accordance with this invention can also be made as a detachable or fixed accessory to printing machines or proof printing machines, and particularly to such two-color letter presses, which print the first one of two colors from a cylinder. This latter modification is constructed so that the printing cylinder operates as model carrier cylinder. The scale adjustment is effected by an adjustable glide movement caused by the rotating movement of the cylinders or by some other part of the printing press, synchronized with the cylinders, and which actuates the optical system or part of it. As it is necessary to examine various areas scattered on the printing surface again and again at random in different order, the printing machine may be provided with a mechanism by which it can be turned to and fro at slow adjustable speed.

Returning to the embodiment of FIGURES 1–3, the cylinder 33 is supported by ball bearings mounted on the shaft 26 and which allow axial play, the balls 59 placed at one end being shown. The cylinder 33 is loaded by a spring 27 against a transverse control device 60 on one end enabling the cylinder to be adjusted axially on the shaft 26.

The surface of the cylinder 33 (FIG. 7) is made of a thin sheet 61, which lies on the cylinder frame. This sheet is fixed along one edge to a bar 63, which is connected to the shaft **40*a* by a bracket 62*a* (FIG. 3) and a pin 62. The bar 63 runs the length of the cylinder. The other end of the sheet 61 is fastened to the other edge of the same bar 63 through part 64 by means of a tensioning spring 65. The spring is a long sinuous spring compressed between the bar 63 and part 64. When the sheet edge connected to part 64 is moved in the direction of the axis of the cylinder by means of an adjusting screw, the cover sheet 61 turns on the cylinder frame round the pin 62. The basic picture being fixed on this sheet, can be skewed in both directions. The pattern is pressed for instance with the aid of a wedge 67, located under the sheet, against a fixed strip 68 which is at a small distance from the surface. Because of the three different regulation possibilities 45, 60, 66**, it is not necessary to fix the basic picture in its final exact position. Through these adjustment means it may later be moved to its correct position.

On the guide bars 17, 18 (FIGS. 1 to 3) moves a smaller carriage which carries the optical system. The frame of this carriage consists of one piece 69. The suspension of the carriage is provided by two statically determined components which are perpendicular to each other, as shown by arrows 70, 71 in FIG. 3. In this instance one direction is supported by three wheels 72, 73, 74, and the other by two other wheels 75, 76. The wheels may be provided with eccentric hubs for regulating the position of the optical sysem. The optical system and its carriage are completely stable during operation. Consequently there is nothing in them to decrease the accuracy. Guide bar 17 is placed with respect to the optical system on a line 77 which passes through the points at which the optical axis meets on one hand the cylinder, on the other hand the printing surface. When the constructions are under stress through the use of a microscope chin rest 93, they bend. Due to the location and to the different strength of the guide bars 17, 18, the projections of the movements of the superposed images in the image plane of the objective are parallel and equal so that the images remain immobile on top of each other in any usual loading instances.

The carriage 69 is equipped with a locking device similar to that of the main carriage. Thus by locking the carriage with a screw 78 to a wire 79 it is possible to carry out longitudinal rulings in the same way as the corresponding transverse ones.

When the optical system is locked in its place, the pattern on the cylinder 33 appears as an immobile image, and simultaneously with it the printing surface to be mounted, or part of it, which can be moved to correct position. Two prisms 80, 81 combine the pattern on the cylinder 33 and the printing surface to be mounted, or part of it, which is on the bed 1, into simultaneously seen images, which are looked at through the objective 84, either monocularly or (as shown) at 85 binocularly. In this manner it is possible with microscopic precision to command the entire printing plane, a small area at a time. The combining of the images can be achieved as usual either with the prisms 80, 81 or a half-silvered mirror 82 (FIG. 4 and FIG. 5). At wide view angles and great diameters the mirror solution is better. It is necessary to use achromatic prisms at wide view angles. For great accuracy it is better to use a compensating glass sheet 83 in connection with the mirror 82, to insure that the image sizes remain equal. If the glass sheet 83 is placed according to FIGURE 4 the construction will be dust tight. It is also possible to provide each image with its own objective in front of the prism or semi-mirror combining the images. In the construction according to FIGURES 1–3 an extra third image of a screen 84*a* may be combined with those mentioned before by means of a half-silvered mirror 89. This image is immobile in the image plane but can be adjusted if required. Crossed hairs with a scale may constitute this third image to be used for instance in conjunction with the previously mentioned scale 6 when fastening the basic picture. Crossed hairs may be provided in other known ways. The enlargement can be varied by adjusting the eye-piece or the objective. The basic picture is lighted with dispersive light from a lamp 85*a* and the printing surface by a top projection lighting system 86 in order to reach maximum resolving power of details. Each of the lights is controlled by a resistance, 87 and 88, respectively. The projection system in this variation is built somewhat differently from the standard one. In the standard construction, which also can be used, the objective proper also functions as light objective, and the light reflecting glass 89 is above the objective 84. This lighting system may be replaced by some other illumination system providing that the quality of the printing surface so requires. The system described is intended for such surfaces where the printing surface because of its glossiness is more distinct than a place which does not print, as in letter press or, vice versa, as in gravure printing press. Image focussing can be carried out for instance as follows: The image of the printing surface is focussed by altering the length of the eyepiece tubes 90. The focussing of the basic picture is done by moving a slide 91. With a button 92 the distance of the eyepieces can be suitably adjusted.

The images of the basic picture and of the printing surface to be mounted can also be projected on ground glass and sufficiently enlarged solely by means of the objective system. In this case a considerably more powerful illumination is required for both images. This can be effected for instance with a powerful lighting source fixed for instance to the frame or to the end of the guide carriage. From this illumination source, either direct from the carriage end or from the frame via a reflective plane fixed to the carriage, a parallel light beam is pointed to the projection illuminator. The dispersive light required by the basic picture is readily obtained by more powerful lamps.

The operator can move the optical system with his head by means of a chin rest 93 fixed to the carriage frame 69. Both hands will thus be free for the precision work at hand. The chin rest 93 may be adjusted individually. A holder for the operator's head can be provided for the same purpose. When the register microscope is an accessory in printing machines, the operator moves the optical system transversely with his head with the aid of the chin rest while it is possible to control with the head the machinery for effecting adjustment in the printing direction.

*The use of the register microscope*

The basic picture is made by pulling the basic printing surface for instance in a proof printing machine, or it can also be made by sizing the pictures on their positions on paper. The basic picture is fastened on the cylinder 33 of the register microscope, on a place transversely determined by the printing machine. The transverse adjustment may be finished after the fastening by use of the control 60 for instance within a ±4 mm. range. If the basic picture is made by pulling, the basic printing surface is fixed to the cylinder, and the basic picture and the printing surface or its parts are fitted together at desired accuracy by using the cylinder axial adjustment 60, the longitudinal adjustment 45, the skew adjustment 66 and the scale adjustment 37. The basic printing surface is removed and the other printing surfaces are made. If the basic picture is made by sizing, or if an old basic picture or drawing (if sufficiently exact) is available, the basic picture is fastened on the cylinder as described above. The edge of the basic picture is adjusted to its final position in the longitudinal direction, i.e. the peripheral direction of the cylinder, which position is found on the scale 6 fixed to the frame. By means of screw 66 it is straightened with described precision by means of ruling carried out by the locked guide carriage. A suitable scale adjustment having been found all the printing surfaces are made one after the other. Any intermediate stage can be used as basic picture for the following stage, or for the rest of the stages.

A machine in accordance with this invention makes it possible to achieve a very great accuracy, sufficient for instance for 60 line per cm. screen ruling multicolor works. A further advantage is that the hands are all the time free for the mounting work, since the head is used to control movements thus making for more practicality. The great measuring accuracy can be utilized all the time throughout the entire printing surface. The registration accuracy of the machine can readily be made to fulfill the greatest requirements, and it may easily be altered. A value of about 0.01 mm. has been chosen as suitable for the prototype. The mechanical operating accuracy of the prototype machine is about ±0.02 mm.

A machine in accordance with this invention, as specifically described or modified, is suitable for many other uses than those described here, for instance in the making of multicolor blocks, in engraving, in register work for rotary machines in neutral plane measuring for various sheet materials, in examination of rolling, in reference length measurings, in measurings of errors of division, in glide measurings of rotating movements, and in scale corrections. Among other things it is possible to carry out programmed reproductions of variable-scale pictures for instance with those described types of scale adjustment in which the glide movement is obtained by means of a ruler, by giving the ruler a profile which follows the same law as the scale deviations with respect to displacement in the printing direction.

I claim:

1. Apparatus for effecting desired registration between a pattern and a printing surface comprising: support means upon which said printing surface is mountable, pattern carrier means upon which said pattern is mountable, said pattern carrier means being mounted on said support for relative movement with respect to each other in a given direction, optical means mounted on said pattern carrier means for simultaneously viewing superimposed images of a portion of said pattern and a related portion of said printing surface for comparing said portions, means for regulating the said relative movement between said support and said pattern carrier means so that said images remain superimposed, and adjustable supplemental movement means connected between said support means and said pattern carrier means and responsive to said relative movement between said support and said pattern carrier means to effect adjustable supplemental relative movement between said support and said pattern carrier means so that said superimposed images appear to slide with respect to each other in an adjustable manner.

2. Apparatus according to claim 1 wherein said support and said pattern carrier means are both cylindrical.

3. Apparatus according to claim 1 wherein said support means is a flat surface and said pattern carrier means is cylindrical.

4. Apparatus for effecting desired registration between a pattern and a printing surface comprising: a support on which said printing surface is mountable, a carriage mounted on and movable with respect to said support in a given direction, a movable member mounted on said carriage upon which said pattern is mountable, optical means mounted on said carriage for simultaneously viewing superimposed images of a portion of said pattern and a related portion of said printing surface for comparing said portions, relative movement regulating means mounted on said support and on said carriage for regulating the movement of said carriage with respect to said support so that said images remain superimposed as said pattern moves relative to said printing surface in said given directions, and adjustable supplemental movement means mounted on said support and on said carriage which are operable in response to movement of said carriage to effect adjustable supplemental movement of said movable member so that said superimposed images appear to slide with respect to each other.

5. Apparatus for effecting registration between a pattern and printing surfaces comprising: a flat surfaced support on which said printing surface is mountable, a first carriage movable on said support, a shaft rotatably mounted on said first carriage, first and second gears fixed to the ends of said shaft, first and second racks fixed to both sides of said support for cooperation with said first and second gears to effect control of the movement of said first carriage, when it is moved forward and backward, a third rack slidably mounted beside the said first rack, a third gear which is different in size than the said first gear and which is fixed beside said first gear to said shaft, for cooperation with said third rack to effect movement of said third rack when said first carriage is moved forward and backward, a fourth rack slidably mounted beside said second rack, a lever connected to said third and fourth racks, a fulcrum for said lever adjustably mounted on said support, so that said lever transmits the movement of said third rack adjusted in the relation of the lever arm lengths of the lever to said fourth rack so that said fourth rack becomes adjustably movable when said first carriage is moved forward and backward, a cylinder rotatably mounted on said shaft on which said pattern is mountable, a fourth gear fixed to said cylinder for cooperation with said adjustably movable fourth rack to effect adjustable rotation of said cylinder in relation to said support when said first carriage is moved forward and backward, a second carriage moving in the direction of said shaft on said first carriage, an optical device fixed to said second carriage including a magnifying device, light sources for said pattern and said printing surface and a transparent reflector for simultaneously viewing images of a portion of said pattern and a portion of said printing surface, said images sliding more or less with respect to one another according to the adjustment of the rotation of said cylinder, said first carriage giving a common first coordinate movement in the direction of the printing to said images at the same time as said first carriage causes said adjustable sliding in the direction of the printing to said images with respect to one another, said second carriage giving a common second coordinate movement in the transverse direction.

No references cited.

JEWELL H. PEDERSEN, *Primary Examiner.*

A. A. KASHINSKI, *Assistant Examiner.*